United States Patent Office

3,438,997
Patented Apr. 15, 1969

3,438,997
POLYOL SYNTHESIS USING FORMALDEHYDE
AND OLEFINS
Lloyd C. Fetterly and George W. Conklin, Oakland, Calif.,
assignors to Shell Oil Company, New York, N.Y., a corporation of Delaware
No Drawing. Continuation of application Ser. No.
280,110, May 13, 1963. This application May 11,
1966, Ser. No. 549,143
Int. Cl. C07c 29/14
U.S. Cl. 260—340.7     14 Claims This application is a continuation of copending application U.S. Ser. No. 280,110 filed May 13, 1963, and now abandoned.

This invention relates to a novel process for the production of alcohols. It further relates to a novel process for the condensation of formaldehyde and olefins to form alcohols and alcohol precursors.

The condensation of olefins with aldehydes, particularly formaldehyde, is old in the art, frequently being referred to as the Prinz Reaction. One modification of this condensation was widely investigated as a method for the production of diolefins to be used in synthetic rubber formulations. Although somewhat satisfactory methods for diene production were developed, the advent of the more economical dehydrogenation and cracking processes for the production of butadiene and isoprene prevented olefin-aldehyde condensation methods from realizing commercial importance. The olefin-aldehyde condensation remains, however, a valuable method for the production of organic chemical intermediates such as polyols, m-dioxanes, esters and ethers.

In general, available methods for effecting the condensation of formaldehyde with olefins are liquid-phase reactions which comprise heating the reactants in aqueous or glacial acetic acid solution for a period of hours at high pressure in the presence of an acidic catalyst. The resulting products are m-dioxanes or acetate esters, depending upon the solvent employed. For example, the French Patent 933,182 to Olsen discloses that acetate esters of trimethylene glycol and trimethylol ethane are prepared by reaction of ethylene with formaldehyde in glacial acetic acid solution over a sulfuric acid catalyst in an autoclave at 130–140° C. at 40 atmospheres pressure during a period of 12 hours.

Such processes are necessarily conducted in a batch-type operation, and although suitable for the production of relatively small amounts of material, are not adaptable for the large scale continuous type of operation so important in contemporary commercial processes.

It is a principal object of this invention to provide an improved process for the condensation of formaldehyde and olefins to form alcohols and oxygen-containing alcohol precursors. A further object is to provide a novel process wherein the olefin-formaldehyde condensation is conducted in the vapor phase and is therefore adaptable for continuous operation. An additional object is to provide a process for the preparation of alcohols and related products that serve as valuable chemical intermediates.

These objects are accomplished by the process which comprises the vapor-phase reaction of an olefin and formaldehyde, in polar reaction diluent, in the presence of acidic catalyst. The condensation is effected by passing a mixture of the reactants and diluent over the catalyst in a suitable reactor. The products from such a condensation are alcohols or oxygen-containing materials from which alcohols may readily be obtained.

The olefins employed in the process of the invention contain up to 8 carbon atoms, and preferably are aliphatic, acyclic olefins. The process is applicable to both monoolefins and polyolefins, although monoolefins are preferred, and the olefin may contain terminal or internal ethylenic linkages. It is within the scope of the process of the present invention to employ olefins that are unsubstituted hydrocarbon, or that are substituted with radicals such as halogen, hydroxyl, carboalkoxy, alkyloxy and the like. Preferred olefins for the process of the invention are hydrocarbyl monoolefins and more preferably are alpha-olefins, that is, contain a terminal olefinic linkage. Illustrative of such preferred olefins are ethylene, propylene, 1-butene, 1-pentene, 2-methyl-1-pentene, 1-hexene, 1-octene,3,4-dimethyl-1-hexene, 3-ethyl-1-pentene and the like. Particularly preferred olefins are the lower alkyl alpha monoolefins having from 2 to 4 carbon atoms.

The formaldehyde is employed in any convenient form. When water is to be present as the reaction diluent, the formaldehyde is conveniently introduced as an aqueous solution. Alternatively, when anhydrous conditions are desired, the formaldehyde may be introduced into the reactor in the form of trioxane, which depolymerizes under the reaction conditions.

Reaction diluents that are satisfactorily utilized in the vapor-phase condensation are polar, normally liquid reaction diluents, particularly non-phenolic mono-hydroxylic diluents. Preferred reaction diluents contain no atoms other than carbon, hydrogen and oxygen within the diluent molecule, contain only one functional group, and contain from 0 to 4 carbon atoms. Illustrative of the preferred diluents are water; the lower alkyl monocarboxylic acids, e.g., acetic acid, propionic acid, and butyric acid; and alcohols such as methanol, ethanol, propanol, isopropanol, and n-butanol. When diluents other than water are employed, it is preferred that they be substantially anhydrous, that is, contain less than about 5% water, and single reaction diluents are to be preferred over mixtures of two or more diluents. Particularly preferred reaction diluents for the process of the invention are single diluents containing from 0 to 2 carbon atoms, e.g., water, anhydrous methanol, and glacial acetic acid.

The presence of inert gaseous materials in the reaction mixture does not appear to be detrimental. Thus, the condensation may be effected in the presence of sulfolanes, ethers, e.g., dioxane, and the like. Alternatively, the reaction may be conducted using a mixed olefin-paraffin feed, e.g., a mixture of butene and butane, without the necessity of prior separation.

Suitable catalysts are those acidic materials characterized as cationic exchange resins. As a class, these resins are high molecular weight polyacids which are virtually insoluble in and inert to the reaction mixture. They preferably consist of a three-dimensional hydrocarbon network to which are attached the acid groups which act as the ion exchangers.

The cation exchangers can contain sulfonic, phosphonic, phosphonous, arsenic and like acid groups. Strongly acidic cation exchangers such as sulfonated cross-linked polystyrene are especially advantageous. Examples of these cationic exchangers are Amberlite IR–120 and Amberlyst 15 produced by Rohm and Haas Company, Chempro–20 and Duolite C-25 of Chemical Process Company, Dowex 50 of Dow Chemical Company, Nalcite HCR of National Aluminate Corporation and Permutit Q of Permutit Company. Sulfonated phenol-aldehyde condensation products are another form of suitable cation exchange resin which can be used in the process of the invention. The sulfonic acid group in these resins can be on a side chain, as in a —$CH_2SO_3H$ group, or attached directly to the aromatic nucleus. The first named type is made, for example, by heating together phenol, formaldehyde and a mixture of sodium sulfite and sodium metabisulfite and then adding additional phenol and formaldehyde and heating to gelation, or is made by introducing the sulfonic groups into a preformed phenol-formaldehyde condensate. The second type can be prepared by reacting a paraphenol sulfonic acid with formaldehyde and phenol and heating the resin in drying pans to remove the excess water and form cross linkages. This resin has both —SO₃H and —OH groups attached to the aromatic ring.

The reactor used in the process of the invention is customarily tubular in form and may be constructed of any inert material, such as stainless steel. The shape, diameter, and length of the reactor are not critical, although care should be taken to employ a reactor sufficiently long to insure adequate contact time between the reactants and the catalyst. Generally a tube from about 0.5 to about 2 inches in diameter and from about 2 to about 20 feet long is satisfactory. To provide for reactions above room temperature, some form of heating device is customarily included. This device may be in the form of an external wrapping or jacketing, or in the form of a thermo-well within the reactor tube. The reactor is generally mounted in a vertical position and contains the solid acidic catalyst. A particularly useful modification of the reactor tube has the uppermost portion of the tube, approximately one-tenth of the total tube length, filled with glass beads or some other inert porous material and serves as a pre-heating but non-reactive chamber. In such a modification, the reactants are introduced at the top of the reactor and are thus preheated during downward passage toward the catalyst. Such preheating is not invariably required, however, and in fact it may be desirable to cool the reactor as by enclosing it within a refrigerated chamber. When the reactants are introduced at the top of the reactor, the products are recovered at the bottom where the effluent vapors are condensed. The reactor mounting, reactor dimensions and direction of flow may of course be varied to meet particular process requirements.

The molar ratio of reactants to be used will depend upon the degree of unsaturation of the olefin and the type of product that is desired. With water as a diluent, limiting the amount of formaldehyde tends to promote the formation of glycols, while larger amounts of formaldehyde increases the extent of condensation and generally results in the formation of polyhydric alcohols and formaldehyde condensation products therewith. Although molar ratios of formaldehyde to olefinic linkage from about 1:5 to about 10:1 are operable, it is preferred to use molar ratios of formaldehyde to olefinic linkage of from about 1:2 to about 2:1. It is further preferred that a molar excess of reaction diluent be present. Molar quantities of diluent from about 1 to about 10 times the molar quantity of the limiting reactant are satisfactory.

The reactants and reaction diluent may be introduced into the reactor separately or may be premixed and added as a single feed. A preferred modification is to mix the diluent and formaldehyde and add this mixture to the olefin at the time of entry into the reactor. The reactants may be introduced into the reactor as gases or as liquids. As the reaction is conducted in the vapor phase, it is preferred to introduce the reactants as gases whenever the volatility of the materials will allow. However, it is also possible to introduce one or both of the reactants as liquids, which under the elevated temperatures employed in such an instance, vaporize to allow the vapor-phase condensation to occur. By control of the rate of addition and the temperature employed, substantially all of the liquid reactant is vaporized and thus essentially complete conversion is obtained in the vapor phase.

The condensation is conducted throughout a range of temperatures, with the optimum temperature depending upon the particular catalyst and reaction diluent employed, and the reactivity of the particular olefin. When using a highly reactive olefin, it may be necessary to cool the reaction mixture below room temperature, and temperatures as low as 0° C. may be used. More frequently, however, the reaction proceeds at an optimum rate if heating is provided. Too high a temperature, however, results in the decomposition of the desired product with consequent lowering of yield. In general, temperatures from about 0° C. to 250° C. are satisfactory, with temperatures from about room temperature, i.e., 20–30° C., to about 180° C. being preferred.

The condensation may be conducted at atmospheric, superatmospheric, or reduced pressure. In contrast with previously reported liquid-phase processes which appear to require elevated pressures, the process of the present invention is most easily conducted at or near atmospheric pressure. Although pressures as low as 0.1 atmosphere and as high as 200 atmospheres may be employed, pressures from about 0.5 to about 50 atmospheres are preferred.

As previously stated, the reaction is conducted in the vapor phase. This procedure offers the substantial advantage of making possible a continuous operation. It further provides for adequate contact between reactants and catalysts, with consequent improved yield of product. Perhaps the most important feature of the vapor-phase reaction is that reaction times are of short duration. Whereas conventional liquid-phase condensations require batch-type operations with reaction times of several hours or longer, the vapor-phase reaction of the present invention utilizes contact times of minutes or less. While the most preferred contact time will be dependent upon the reactants, reaction diluent and reaction conditions, contact times from several seconds to several minutes are usually satisfactory, with a contact time of less than 2 minutes being preferred.

The products resulting from the condensation of formaldehyde with olefins are of varying types, depending upon the diluent used and the ratio of formaldehyde to olefin employed. When water is used as the reaction diluent, glycols and m-dioxanes are customarily produced. Carboxylic acid diluents lead to the formation of ester products, while alcohol diluents result in the formation of ethers.

Illustrative of m-dioxanes produced from acid-catalyzed condensation of olefin and formaldehyde in the presence of water as reaction diluent are 4-methyl-1,3-dioxane; 4,4-dimethyl-1,3-dioxane; 4-n-butyl-5-methyl-1,3-dioxane and the like, while glycols produced under similar conditions but with limited amounts of formaldehyde reactant are 1,3-butandiol; 2-methyl-1,3-butandiol; 2-ethyl-1,3-hexandiol and the like.

Exemplary acetate esters produced when glacial acetic acid is employed as diluent include 1,3-diacetoxypropane; 1,3-diacetoxybutane; and 1,3-acetoxyhexane, while ethers produced in the presence of alcohol diluents are illustrated by methoxy(3-methoxybutoxy)methane and methoxy(3-methoxyoctoxy)methane.

When the condensation of olefin with formaldehyde results in products wherein dihydroxy, diacetoxy or acetoxyhydroxy substituents are in 1,4- or 1,5-positions relative to each other, cyclization frequently occurs and along with other products, substituted tetrahydrofurans and tetrahydropyrans are obtained. For example, the reaction of formaldehyde with propylene under aqueous conditions results in the formation of 4-hydroxytetrahydropyran along with 4-methyl-1,3-dioxane and 1,3-butandiol.

The ether and ester products of the condensation process of the invention are converted to alcohols by conventional acid-base hydrolysis. Hydrolysis is effected by heating the condensation product with catalytic amounts of aqueous acid or base, by treatment with ion exchange resins of an aqueous solution of the condensation product, or by other conventional methods. Illustrative alcohols produced thereby include 1,3-butandiol; 1,3-hexandiol; 1,3,5-pentandiol; trimethylol ethane, 1,3-propandiol, 1,3-octandiol, trimethylol propane and 1,3,5-octandiol.

To illustrate the novel condensation process of the present invention, the following examples are provided. It

EXAMPLE I

The reactor employed in the following examples was a stainless steel tube measuring 11/16 inch inside diameter and 32 inches long. It contained a 0.5 inch coaxial thermocouple. The catalyst bed, about 22 to 24 inches long, was centrally located along the length of the tube. The reactor was vertically mounted in an electrically heated furnace. The feed was introduced at the top and products were withdrawn at the bottom and their composition determined.

Into the reactor was fed a solution of 20% by weight trioxane in water at the rate of 26 g./hr. and propylene was fed at the rate of 4.6 g./hr. The catalyst employed was Amberlyst 15 sulfonic acid resin and was maintained at a temperature of 104–106° C. The condensation was effected at a pressure of 93 p.s.i.g. The propylene was converted in 90% yield to a mixture containing 68% mole 4-methyl-1,3-dioxane, about 12% mole 4-hydroxytetrahydropyran, and about 7% mole 1,3-butanediol. Product analysis was by gas-liquid chromatography.

EXAMPLE II

A commercial formalin solution containing 35.8% w. formaldehyde and about 12% w. methanol was fed into the above-described reactor at a rate of 59 g./hr. along with propylene introduced at the rate of 22 g./hr. The catalyst was Amberlyst 15 sulfonic acid resin at a temperature of 104–108° C.; the pressure was 500 p.s.i.g. Approximately 74% of the propylene was converted to a product mixture containing 68% mole 4-methyl-1,3-dioxane and about 19% mole 4-hydroxytetrahydropyran.

EXAMPLE III

A solution of 13.6% w. of trioxane in glacial acetic acid was fed to the reactor at a rate of 83 g./hr., along with propylene at the rate of 23 g./hr. The catalyst was Amberlyst 15 sulfonic acid resin at an average bed temperature of 83° C. The pressure was 85 p.s.i.g. Of the propylene fed, about 17% was converted to 1,3-diacetoxybutane, about 7% to 4-acetoxytetrahydropyran, about 3% to 4-methyl-1,3-dioxane and about 9% to isopropyl acetate.

EXAMPLE IV

A solution of 17.6% w. trioxane in glacial acetic acid was fed at 63 g./hr. and ethylene was fed at 7.6 g./hr. to a reactor containing Dowex 50WX8, 20/50 mesh, which had been washed with glacial acetic acid. The average bed temperature was 101° C. and the pressure was 620 p.s.i.g. A yield of about 14 g./hr. of 1,3-diacetoxypropane was obtained. Hydrolysis of the product yields trimethylene glycol.

EXAMPLE V

When 1-hexene is reacted with formaldehyde in glacial acetic acid in the presence of Amberlyst 15 sulfonic acid resin, good yields of 1,3-diacetoxyheptane are obtained.

We claim as our invention:

1. The continuous process for the production of glycols by contacting in the vapor phase an alkene having up to 8 carbon atoms with formaldehyde, the molar ratio of formaldehyde to said alkene being from about 1:5 to about 10:1, in a normally liquid polar monohydroxylic reaction diluent selected from the group consisting of water, alkanoic acids having up to 4 carbon atoms and alkanols having up to 4 carbon atoms, in the presence of an acidic cationic exchange resin catalyst at a temperature from about 0° C. to about 250° C. for a contact time of less than two minutes, and hydrolyzing the resulting oxygen-containing reaction product to the glycol.

2. The process of claim 1 wherein the catalyst is sulfonic acid resin.

3. The process of claim 1 wherein the alkene is a 1-alkene, the catalyst is a sulfonic acid resin catalyst and the temperature is from about 20° C. to about 180° C.

4. The process of claim 3 wherein the diluent is water.

5. The process of claim 3 wherein the diluent is glacial acetic acid.

6. The process of claim 3 wherein the alkene is alkene of from 2 to 4 carbon atoms.

7. The continuous process for the production of a material selected from the group consisting of glycols, esters thereof, and ethers thereof which comprises contacting in the vapor phase an alkene having up to 8 carbon atoms with formaldehyde, the molar ratio of formaldehyde to said alkene being from about 1:5 to about 10:1, in a normally liquid polar monohydroxylic reaction diluent selected from the group consisting of water, alkanoic acids having up to 4 carbon atoms and alkanols having up to 4 carbon atoms, in the presence of an acidic cationic exchange resin catalyst at a temperature from about 0° C. to about 250° C. for a contact time of less than two minutes.

8. The process of claim 7 wherein the catalyst is sulfonic acid resin.

9. The process of claim 7 wherein the alkene is a 1-alkene, the catalyst is a sulfonic acid resin catalyst and the temperature is from about 20° C. to about 180° C.

10. The process of claim 9 wherein the alkene is alkene of from 2 to 4 carbon atoms.

11. The process of claim 10 wherein the diluent is water.

12. The process of claim 10 wherein the diluent is glacial acetic acid.

13. The process of claim 10 wherein the alkene is propylene.

14. The process of claim 10 wherein the alkene is ethylene.

References Cited

UNITED STATES PATENTS

| | | | |
|---|---|---|---|
| 2,143,370 | 1/1939 | Fitzky | 260—635 |
| 2,426,017 | 8/1947 | Hamblet et al. | 260—340.7 |
| 2,803,667 | 8/1957 | Chambers | 260—641 |
| 2,997,480 | 8/1961 | Hellin et al. | 260—340.7 |

FOREIGN PATENTS

| | | |
|---|---|---|
| 933,182 | 4/1948 | France. |
| 1,292,840 | 3/1962 | France. |
| 824,551 | 12/1959 | Great Britain. |

OTHER REFERENCES

Arundale et al.: "Chem. Reviews," vol. 51, No. 3, (December 1952), pp. 505 to 555.

Sussman: "Industrial and Engineering Chemistry," vol. 38 (1946), pp. 1228–1230.

LEON ZITVER, *Primary Examiner.*

J. E. EVANS, *Assistant Examiner.*

U.S. Cl. X.R.

260—633, 615, 635, 494, 345.8, 345.9, 496